United States Patent Office 3,387,005
Patented June 4, 1968

3,387,005
STEROIDAL 4,6-DIEN-3-ONES HAVING A SUBSTITUTED METHYL GROUP AT $C_6$ AND PROCESS FOR PRODUCING SAME
Derek Burn, Robert Victor Coombs, and Vladimir Petrow, London, England, assignors to The British Drug Houses Limited
No Drawing. Filed Mar. 14, 1966, Ser. No. 533,779
Claims priority, application Great Britain, Mar. 31, 1965, 13,691/65
4 Claims. (Cl. 260—349)

ABSTRACT OF THE DISCLOSURE

New steroidal 4,6-dien-3-ones, particularly of the androstane and pregnane series, having a —$CH_2X$ substituent on $C_6$, wherein X is an anion such as cyano-, thiocyanato-, selenocyanato-, azido-, nitro-, and phthalimido-, produced by reaction of the corresponding 6-halomethyl steroids with a metallic salt of the formula MX, where X is defined above.

---

This invention is for improvement in or relating to organic compounds and has particular reference to new steroidal 4,6-dien-3-ones with a substituted methyl group at $C_6$.

In our copending U.S. applications Nos. 514,676 filed Dec. 17, 1965, and 523,247 filed Jan. 27, 1966, there are described steroidal 6-halomethyl-4,6-dien-3-ones including the partial formula

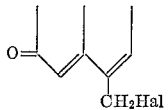

(where Hal is F, Cl, Br and I) and processes for their preparation.

We have now made the important discovery that the halogen atom present in such steroidal 6-halomethyl-4,6-dien-3-ones including the partial Formula II above may be replaced without rearrangement to give products including the partial Formula I below. This is a significant and surprising discovery as allylic structures, as will be known to those skilled in the art, often undergo structural rearrangements when submitted to substitution reactions. We have also made the discovery that some of the novel 6-substituted steroidal 4,6-dien-3-ones including the partial Formula I below can have biological properties which render them of value in the art. In addition, such 6-substituted steroidal 4,6-dien-3-ones including the partial Formula I below are of value as building blocks for the construction of novel hormonally active structures and thus have a technical importance in their own right as intermediates.

Products of the present invention are believed to have active biological properties of the type possessed by analogous known steroids. Thus compounds including the partial Formula I below where X is CN or $N_3$ may show qualitative similarity in their biological properties to the corresponding 6-methyl analogues. Thus for example derivatives of 17α-acyloxyprogesterone (in particular the 6-azidomethyl compounds of Examples 3 and 11) have claudogenic properties and are of value in the control of fertility in the human and veterinary field.

Derivatives of corticoidal types are known to have anti-endotoxic activity. Compounds including the partial Formula I where X is $N_3$ or

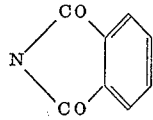

are particularly of value as intermediates due to the presence of these highly reactive groups which are known to be capable of entering into further reactions.

It is accordingly an object of the present invention to provide new 6-(substituted methyl) steroidal 4,6-dien-3-ones including the partial formula

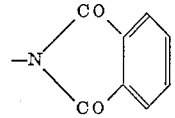

(I)

where X is derived from the anion of a weak acid and is selected from the group consisting of —CN, —SCN, —SeCN, $N_3$, —$NO_2$ and

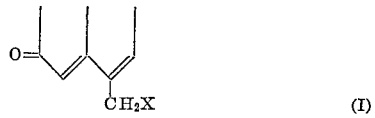

According to the present invention there is provided a process for the preparation of 6-(substituted methyl) steroidal 4,6-dien-3-ones including the partial Formula I above where X has the same meaning as above which process comprises reacting a 6-halomethyl steroidal 4,6-dien-3-one including the partial Formula II above where Hal is F, Cl, Br or I with a metallic salt of the formula

MX where M is K, Na, Li or Ag and X is as hereinabove defined.

The process is carried out in solution or suspension in a dry organic solvent when the following reaction occurs:

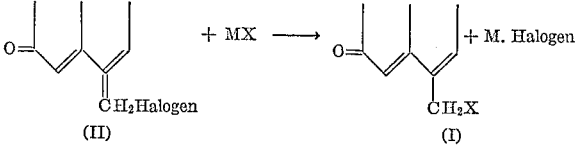

after which the products of the invention may be isolated and purified by methods known to those skilled in the art.

The process of the present invention may be applied to a wide variety of steroidal compounds of the androstane, 19-norandrostane, pregnane and 19-norpregnane series which, in addition to the 6-substituted 4,6-dien-3-one present in rings A and B, may also be substituted by Hydroxyl groups and esterified and etherified derivatives thereof in such positions as $C_{11}$, $C_{12}$, $C_{14}$, $C_{15}$, $C_{16}$, $C_{17}$, $C_{18}$, $C_{19}$, $C_{20}$ and $C_{21}$, including such groups as 16-hydroxymethyl and the condensation products of 16α, 17α- and 17α,21-glycols with carbonyl components.

Carbonyl groups in such positions as $C_{11}$, $C_{12}$, $C_{15}$, $C_{16}$, $C_{17}$, $C_{18}$ and $C_{20}$.

Carbalkoxy groups in such positions as $C_{13}$, $C_{16}$, $C_{17}$ and in the side-chain.

Cyano groups in such positions as $C_{13}$, $C_{16}$ and $C_{17}$.

Alkyl groups and in particular methyl groups in such positions as $C_2$, $C_{11}$, $C_{16}$, $C_{17}$, $C_{21}$ and ethyl groups in such positions as $C_{17}$.

Alkenyl and alkynyl groups and in particular vinyl, allyl, ethynyl, trifluoropropynyl, trifluorovinyl and chloroethynyl groups at $C_{17}$.

Methylene and ethylidene groups in such positions as $C_{11}$, $C_{16}$, $C_{16}:C_{17}$ and $C_{17}$.

Lactone, ether and spiroketal groups and in particular spirolacetone groups including

—O—CO—CH$_2$—CH$_2$— at $C_{17}$, etheric groups at $C_{16}$ and bridging $C_{18}$ and $C_{20}$ and spiroketal groups including the sapogenin side-chain.

Fluorine atoms in particular at $C_9$.

Unsaturated linkages including carbon-carbon double-bonds in such positions as $C_1$, $C_{9(11)}$, $C_{11}$, $C_{14}$, $C_{15}$, $C_{16}$ and $C_{17(20)}$.

The process of the present invention may be applied to the 6-halomethyl-4,6-dien-3-one compounds derived from the following steroids and their acyl derivatives:
testosterone and 19-nor derivatives thereof
2-methyltestosterone and 19-nor derivatives thereof
17α-methyltestosterone and 19-nor derivatives thereof
9(11)-dehydro-17α-methyltestosterone and 19-nor derivatives thereof
17α-propynyl, 17α-chlorethynyl, 17α-trifluoropropynyl, 17α-trifluorovinyl testosterone and 19-nor derivatives thereof
17α-acyloxyprogesterones and 19-nor derivatives thereof
9(11)-dehydro-17α-acyloxyprogesterones
16-methyl-17α-acyloxyprogesterones
9(11)-dehydro-16-methyl-17α-acyloxyprogesterones
16-methylene-17α-acyloxyprogesterones
9(11)-dehydro-16-methylene-17α-acyloxyprogesterones
17α-acyloxy-16-ethylideneprogesterones
16α,17α-dimethylmethylenedioxyprogesterone
9(11)-dehydro-16α,17α-dimethylmethylenedioxyprogesterone
cortisone
16-methylcortisone
21-methylcortisone
16-methylenecortisone
16α-hydroxy cortisone and the (16α,17α)-acetonide thereof
hydrocortisone
16-methylhydrocortisone
21-methylhydrocortisone
16-methylenehydrocortisone
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11)-diene-3,20-dione
21-methyl-17α,21-dihydroxypregna-4,9(11)-diene-3,20-dione
16-methylene-17α,21-dihydroxypregna-4,9(11)-diene-3,20-dione
16α-hydroxy-17α,21-dihydroxypregna-4,9(11)-diene-3,20-dione and the (16,17)-acetonide thereof
21-hydroxypregna-4,17(20)-dien-3-one
11-oxo-21-hydroxypregna-4,17(20)-dien-3-one
11,21-dihydroxypregna-4,17(20)-dien-3-one
9(11)-dehydro-21-hydroxypregna-4,17(20)-dien-3-one
3-oxopregna-4,17(20)-dien-21-oic acid (esters)
3,11-dioxopregna-4,17(20)-dien-21-oic acid (esters)
11-hydroxy-3-oxopregna-4,17(20)-dien-21-oic acid (esters)
9(11)-dehydro-3-oxopregna-4,17(20)dien-21-oic acid (esters)
progesterone
16-methylprogesterone
11-oxoprogesterone
9(11)-dehydroprogesterone
diosgenone
21-methylprogesterone
17α-cyano-17β-hydroxyandrost-4-en-3-one
16 (α and β)-hydroxytestosterone and 19-nor derivatives
16-methyl-16,17-dehydroprogesterone
16-cyano-progesterone
16-carbalkoxyprogesterones
16-hydroxymethylprogesterone
3-(3-oxo-17β-hydroxyandrost)-4-en-17α-yl) propionic acid
testololactone The 9α-fluoro derivatives of the above 11β-hydroxy and 11-oxo-steroids.

Following is a description by way of example of methods of carrying the invention into effect.

Example 1.—17α-acetoxy-6-cyanomethyl-16-methylene pregna-4,6-diene-3,20-dione

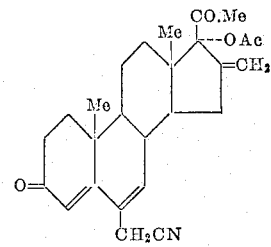

A mixture of 17α-acetoxy-6-bromomethyl-16-methylenepregna-4,6-diene-3,20-dione (0.1 g.) and potassium cyanide (0.05 g.) in dimethylformamide (4 ml.) was stirred at room temperature for 1.5 hours. The mixture was diluted with ether and washed with water. Evaporation of the dried ether solution and crystallisation of the residue from acetone-hexane gave 17α-acetoxy-6-cyanomethyl-16-methylenepregna-4,6-diene-3,20 - dione, M.P. 248° C. decomp., $[\alpha]_D^{24}$ —118° (c., 0.4 in chloroform), $\lambda_{max}$. 277 mμ (ε, 23,000).

Similar treatment of a stoichiometric equivalent amount of

17β-acetoxy-6-bromomethyl-19-norandrosta-4,6-dien-3-one, and
17β-acetoxy-6-bromomethylandrosta-4,6-dien-3-one, and
17α-acetoxy-6-bromomethylpregna-4,6-diene-3,20-dione, and
21-acetoxy-6-bromomethyl-11β,17α-dihydroxypregna-4,6-diene-3,20-dione, and
6-bromomethyl-16α,17α-isopropylidenedioxypregna-4,6-diene-3,20-dione is productive of 17β-acetoxy-6-cyanomethyl-19-norandrosta-4,6-dien-3-one, and
17β-acetoxy-6-cyanomethylandrosta-4,6-dien-3-one, and
17α-acetoxy-6-cyanomethylpregna-4,6-diene-3,20-dione, and
21-acetoxy-6-cyanomethyl-11β,17α-dihydroxypregna-4,6-diene-3,20-dione, and
6-cyanomethyl-16α,17α-isopropylidenedioxypregna-4,6-diene-3,20-dione.

Example 2.—17α-acetoxy-16-methylene-6-thiocyanatomethylpregna-4,6-diene-3,20-dione

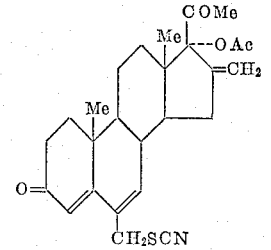

A mixture of 17α - acetoxy-6-bromomethyl-16-methylenepregna-4,6-diene-3,20-dione (0.2 g.), potassium thiocyanate (0.2 g.) and acetone (15 ml.) was stirred at room temperature for 15 minutes and then diluted with water. Crystallisation of the precipitated solid from ethanol gave 17α - acetoxy-16-methylene-6-thiocyanato - methylpregna-4,6-diene-3,20-dione, M.P. 207.5° C. decomp, $[α]_D^{24}$ −140° (c., 0.7 in chloroform), $λ_{max}$ 281 mμ (ε, 22,100).

Similar treatment of a stoichiometric equivalent amount of the 6-bromomethyl steroidal starting materials listed at the end of Example 1 is productive of 17β-acetoxy-6-thiocyanatomethyl-19-norandrosta-4,6-dien-3-one, and 21-acetoxy-11β,17α - dihydroxy-6-thiocyanatomethylpregna-4,6-diene-3,20-dione.

Example 3.—17α-acetoxy-6-azidomethyl-16-methylene-pregna-4,6-diene-3,20-dione

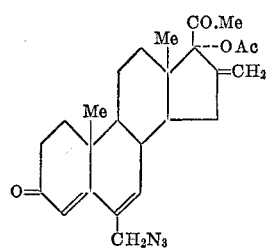

A mixture of 17α-acetoxy-6-bromomethyl-16-methylenepregna-4,6-diene-3,20-dione (0.3 g.) and sodium azide (0.3 g.) in N-methyl-2-pyrrolidone (5 ml.) was stirred at room temperature for 4 hours. The mixture was diluted with dichloromethane and washed with water. Evaporation of the dried dichloromethane solution gave a residue which was crystallised from ethanol to give 17α-acetoxy-6 - azidomethyl-16-methylenepregna-4,6-diene-3,20-dione, M.P. 175–177° C., $[α]_D^{23}$ −122.5° (c., 0.8 in chloroform), $λ_{max}$ 279 mμ (ε, 23,900).

Similar treatment of a stoichiometric equivalent amount of the 6-bromomethyl steroidal starting materials at the end of Example 1 is productive of 17β-acetoxy-6-azidomethyl-19-norandrosta-4,6-dien-3-one, and
17β-acetoxy-6-azidomethylandrosta-4,6-dien-3-one, and
21-acetoxy-6-azidomethyl-11β,17α-dihydroxypregna-4,6-diene-3,20-dione, and
6-azidomethyl-16α,17α-isopropylidenedioxypregna-4,6-diene-3,20-dione.

Example 4.—17α-acetoxy-16-methylene-6-phthalimido-methylpregna-4,6-diene-3,20-dione

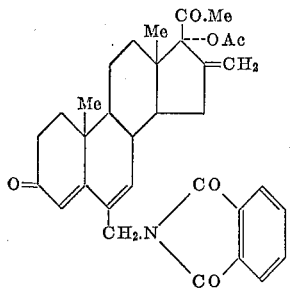

A suspension of 17α-acetoxy-6-bromomethyl-16-methylenepregna-4,6-diene-3,20-dione (0.96 g.) and potassium phthalimide (0.5 g.) in dimethylformamide (10 ml.) was stirred at room temperature for 30 minutes, by which time the steroid had dissolved. The mixture was poured into water to give a precipitate of 17α-acetoxy-16-methylene - 6 - phthalimidomethylpregna - 4,6 - diene-3,20-dione $λ_{max}$ 219 (ε, 43,400), 239.5 (ε, 14,100) and 282 mμ (ε, 22,300).

Similar treatment of a stoichiometric equivalent amount of the 6-bromomethyl steroidal starting materials listed at the end of Example 1 is productive of 17β-acetoxy-6-phthalimidomethyl-19-norandrosta-4,6-dien-3-one, and
17β-acetoxy-6-phthalimidomethylandrosta-4,6-dien-3-one, and
17α-acetoxy-6-phthalimidomethylpregna-4,6-diene-3,20-dione, and
21-acetoxy-11β,17α-dihydroxy-6-phthalimidomethyl-pregna-4,6-diene-3,20-dione.

Example 5.—17α-acetoxy-16-methylene-6-selenocyanato-methylpregna-4,6-diene-3,20-dione

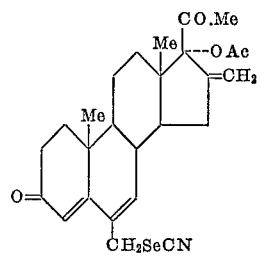

A mixture of 17α-acetoxy-6-bromomethyl-16-methylenepregna - 4,6 - diene - 3,20 - dione (0.2 g.), potassium selenocyanate (0.25 g.) and acetone (10 ml.) was heated under reflux for 5 minutes and then diluted with water. Crystallisation of the precipitated material from ethanol gave 17α-acetoxy - 16 - methylene-6-selenocyanatomethyl-pregna-4,6-diene-3,20-dione as needles, M.P. 205° C., decomp., $[α]_D^{25}$ −130° (c., 0.7 in chloroform), $λ_{max}$ 282 mμ (ε, 20,900).

Similar treatment of a stoichiometric equivalent amount of the 6-bromomethyl steroidal starting materials listed at the end of Example 1 is productive of 17β-acetoxy-6-selenocyanatomethyl-19-norandrosta-4,6-dien-3-one, and
17α-acetoxy-6-selenocyanatomethylpregna-4,6-diene-3,20-dione, and
21-acetoxy-11β,17α-dihydroxy-6-selenocyanatomethyl-pregna-4,6-diene-3,20-dione, and
16α,17α-isopropylidenedioxy-6-selenocyanatomethyl-pregna-4,6-diene-3,20-dione.

Example 6.—17α-acetoxy-16-methylene-6-nitromethyl-pregna-4,6-diene-3,20-dione

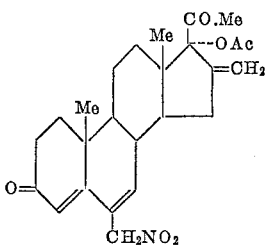

A mixture of 17α-acetoxy-6-bromomethyl-16-methylenepregna-4,6-diene-3,20-dione (1 g.), sodium nitrite (1 g.) and N-methyl-2-pyrrolidone (15 ml.) was stirred at room temperature for 75 minutes. The mixture was then diluted with ether and washed with water. Evaporation of the ether solution left a residue which was crystallised from ethanol to give 17α-acetoxy-16-methylene-6-nitromethylpregna-4,6-diene-3,20-dione as prisms, M.P. 251.5° C. decomp., $[α]_D^{26}$ −104° (c., 0.3 in acetone), $λ_{max}$ 277 mμ (ε, 23,900).

Similar treatment of a stoichiometric equivalent amount of the five 6-bromomethyl steroidal starting materials at the end of Example 1 is productive of 17β-acetoxy - 6 - nitromethyl-19-norandrosta-4,6-dien-3-one, and
17β-acetoxy-6-nitromethylandrosta-4,6-dien-3-one, and 17α - acetoxy - 6-nitromethylpregna-4,6-diene-3,20-dione, and
21 - acetoxy-11β,17α-dihydroxy-6-nitromethylpregna-4,6-diene-3,20-dione, and
16α, 17α - isopropylidenedioxy-6-nitromethylpregna-4,6-diene-3,20-dione.

Example 7.—17β-acetoxy-6-thiocyanatomethylandrosta-4,6-dien-3-one

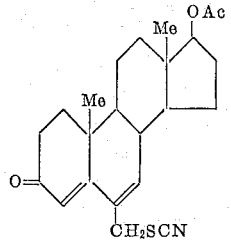

A mixture of 17β-acetoxy-6-bromomethylandrosta-4,6-dien-13-one (1 g.), potassium thicyanate (1 g.) and acetone (50 ml.) was stirred at room temperature for 15 minutes and then diluted with water. Crystallisation of the precipitated material from methanol gave 17β-acetoxy-6-thiocyanatomethylandrosta-4,6-dien-3-one as needles, M.P. 175° C., $[\alpha]_D$ —12.5° (c., 0.4 in chloroform), $\lambda_{max.}$ 282 m$\mu$ ($\epsilon$, 21,700).

Example 8.—17β-acetoxy-6-cyanomethylandrosta-4,6-dien-3-one

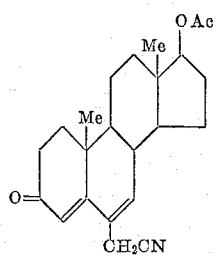

A mixture of 17β-acetoxy-6-bromomethylandrosta-4,6-dien-3-one (0.3 g.) and potassium cyanide (0.15 g.) in dimethylformamide (3 ml.) was stirred for 5 hours at room temperature. The product was isolated with dichloromethane, and crystallised from ethanol to give 17β-acetoxy - 6-cyanomethylandrosta-4,6-dien-3-one, needles, M.P. 163° C., $[\alpha]_D^{29}$ +33.5° (c. 0.2 in chloroform), $\lambda_{max.}$ 278 m$\mu$ ($\epsilon$, 23,300).

Example 9.—17α-acetoxy-6-thiocyanatomethylpregna-4,6-diene-3,20-dione

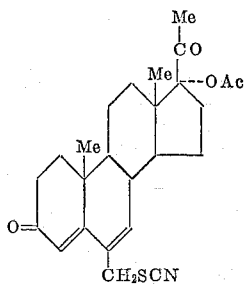

A mixture of 17α-acetoxy-6-bromomethylpregna-4,6-diene-3,20-dione (0.2 g.) and potassium thiocyanate (0.15 g.) in acetone (2 ml.) was stirred for 30 minutes at room temperature. Water was added, and the product purified from ethanol. 17α-acetoxy-6-thiocyanato-methyl-pregna-4,6-diene-3,20-dione formed prisms, M.P. 91° C., $[\alpha]_D^{28}$ —11° (c., 0.8 in chloroform), $\lambda_{max.}$ 281 m$\mu$ ($\epsilon$, 19,500).

Example 10.—16α,17α-isopropylidenedioxy-6-thiocyanatomethylpregna-4,6-diene-3,20-dione

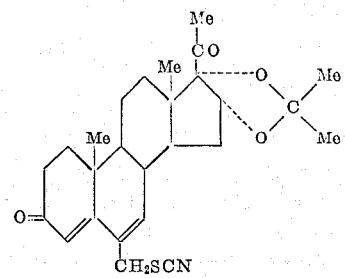

A mixture of 6-bromomethyl-16α,17α-isopropylidenedioxypregna-4,6-diene-3,20-dione (0.15 g.) and potassium thiocyanate (0.1 g.) in acetone (1 ml.) was warmed for 5 minutes at 45° C. Water was added, and the product purified from ethanol to given 16α,17α-isopropylidenedioxy - 6-thiocyanatomethylpregna-4,6-diene-3,20-dione, as plates, M.P. 184° C., $[\alpha]_D^{24}$+20° (c., 0.8 in chloroform), $\lambda_{max.}$ 281 m$\mu$ ($\epsilon$, 22,300).

Example 11.—17α-acetoxy-6-azidomethylpregna-4,6-diene-3,20-dione

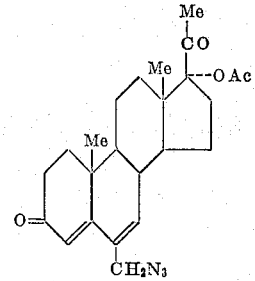

A mixture of 17α-acetoxy-6-bromomethylpregna - 4,6-diene-3,20-dione (0.2 g.) and sodium azide (0.2 g.) in N-methyl - 2 - pyrrolidone (2 ml.) was stirred for 4 hours at room temperature. The product was isolated with ether, and crystallised from ethanol to give 17α - acetoxy-6-azidomethylpregna - 4,6 - diene - 3,20-dione prisms, M.P. 175° C., $[\alpha]_D^{28}$ +13° (c., 0.4 in chloroform), $\lambda_{max.}$ 279 m$\mu$ ($\epsilon$, 23,200).

Example 12.—16α,17α-isopropylidenedioxy-6-phthalimidomethylpregna-4,6-diene-3,20-dione

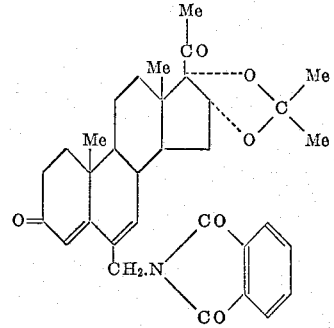

A suspension of 6 - bromomethyl - 16α,17α-isopropylidene-dioxypregna - 4,6 - diene - 3,20 - dione (1 g.) and potassium phthalimide (0.5 g.) in dimethylformamide (10 ml.) was stirred for 1 hour at room temperature. The mixture was poured into water, and the product collected, dried, and purified by chromatography on alumina. Elution of the column with benzene-chloroform gave 16α, 17α - isopropylidene-dioxy - 6 - phthalimidomethylpregna-4,6 - diene - 3,20 - dione which separated from benzene-hexane as solvated crystals, M.P. 140–150° C. (decomp.), $[\alpha]_D^{26}$+134° (c., 1.1 in chloroform), $\lambda_{max.}$ 220 ($\epsilon$, 41,800), 240 ($\epsilon$, 13,300) and 283 m$\mu$ ($\epsilon$, 20,200).

Example 13.—17β-acetoxy-6-selenocyanatomethyl-androsta-4,6-dien-3-one

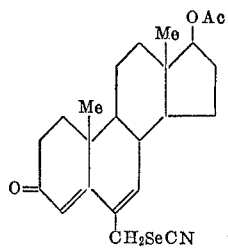

A mixture of 17β - acetoxy - 6 - bromomethylandrosta-4,6-dien-3-one (0.3 g.) and potassium selenocyanate (0.3 g.) in acetone (2 ml.) was stirred for 10 minutes at room temperature. Addition of water gave a solid which was crystallised from ethanol to give - 17β-acetoxy-6-selenocyanatomethylandrosta - 4,6 - dien - 3 - one, needles, M.P. 192.5° C., $[\alpha]_D^{24}$ —33° (c., 0.8 in chloroform), $\lambda_{max}$. 283 mμ (ε, 20,500).

Example 14.—21-acetoxy-6-azidomethyl-11β,17α-dihydroxypregna-4,6-diene-3,20-dione

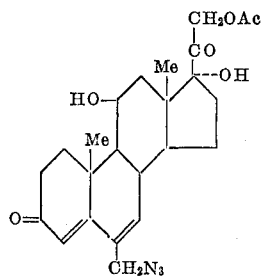

A mixture of 21 - acetoxy - 6 - bromomethyl-11β, 17α-dihydroxypregna - 4,6 - diene - 3,20 - dione (0.2 g.) and sodium azide (0.2 g.) in N-methyl - 2 - pyrrolidone (2 ml.) was stirred for 4 hours at room temperature. The product was isolated with ether, and crystallised from ethanol to give 21 - acetoxy - 6 - azidomethyl - 11β,17α-dihydroxypregna - 4,6 - diene - 3,20 - dione, prisms, $\lambda_{max}$. 279 mμ (ε, 23,200).

Example 15.—21-acetoxy-6-thiocyanatomethyl-11β,17α-dihydroxypregna-4,6-diene-3,20-dione

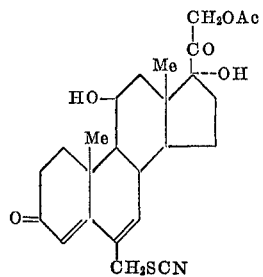

A mixture of 21-acetoxy - 6 - bromomethyl - 11β,17α-dihydroxypregna - 4,6 - diene - 3,20 - dione (0.2 g.) and potassium thiocyanate (0.15 g.) in acetone (2 ml.) was stirred for 30 minutes at room temperature. Water was added, and the product purified from ethanol. 21-acetoxy-6 - thiocyanatomethyl - 11β,17α - dihydroxypregna - 4,6-diene - 3,20 - dione formed prisms, $\lambda_{max}$. 281 mμ (ε, 19,500).

Example 16.—21-acetoxy-6-selenocyanatomethyl-11β, 17α-dihydroxypregna-4,6-diene-3,20-dione

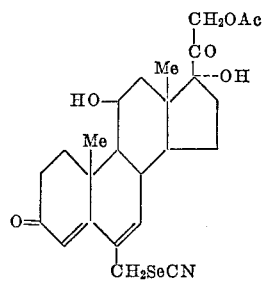

A mixture of 21-acetoxy - 6 - bromomethyl - 11β,17α-dihydroxypregna - 4,6 - dien - 3 - one (0.3 g.) and potassium selenocyanate (0.3 g.) in acetone (2 ml.) was stirred for 10 minutes at room temperature. Addition of water gave a solid which was crystallised from ethanol to give 21-acetoxy - 6 - selenocyanatomethyl - 11β,17α - dihydroxypregna - 4,6 - diene - 3,20 - dione, needles, $\lambda_{max}$. 283 mμ (ε, 20,700).

We claim:
1. 17α-Acetoxy-6-azidomethyl - 16 - methylenepregna-4,6-diene-3,20-dione.
2. 17α-Acetoxy-6-azidomethylpregna - 4,6 - diene-3,20-dione.
3. A process for the preparation of a compound selected from the group consisting of pregnane and androstane 4,6-dien-3-one derivatives having a —CH₂X substituent on C₆, where X is derived from the anion of a weak acid and is selected from the group consisting of —CN, —SCN, —SeCN, N₃, —NO₂ and

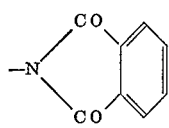

which process comprises reacting a corresponding compound selected from the group consisting of 6-halomethyl pregnane and androstane 4,6-dien-3-ones wherein halo is F, Cl, Br or I with a metallic salt of the formula MX where M is K, Na, Li or Ag and X is as hereinabove defined.

4. A process as claimed in claim 1 wherein the process is carried out in solution or suspension in a dry organic solvent.

References Cited

Burn et al., Chemistry and Industry, March 1966, p. 497 relied on.

ELBERT L. ROBERTS, *Primary Examiner.*